March 29, 1927.
J. L. BLEVINS
1,622,940
ELECTRIC CABLE COUPLING
Filed Aug. 24, 1923
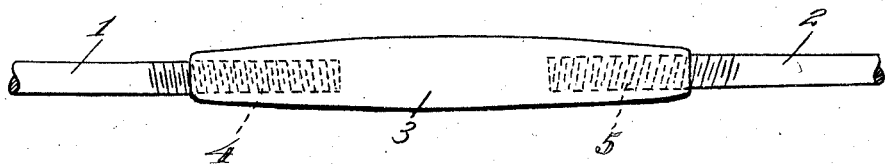
INVENTOR:
James L. Blevins
BY Allen & Allen
ATTORNEYS.

Patented Mar. 29, 1927.

1,622,940

UNITED STATES PATENT OFFICE.

JAMES L. BLEVINS, OF BORDERLAND, WEST VIRGINIA.

ELECTRIC-CABLE COUPLING.

Application filed August 24, 1923. Serial No. 659,076.

My invention relates to electric cable couplings particularly for trolley wires.

The usual soldered splice in heavy wires used for trolley purposes, whereby the current is gathered from the surface of the wire in some desired manner, is not practical in mining work, and the usual special splices now on the market are too costly, particularly when the necessary labor of installation is included.

It has been my object to provide a coupling which will be inexpensive, fully adequate for use with wires for a gathering locomotive or car motor, and establishing full and adequate electric contact. It has also been my object in this invention to provide a coupling which is quickly and easily set in place, under the most adverse conditions, and among other things, can be set in place by the use of one single compound tool.

I accomplish the objects set forth by that certain construction and arrangement of parts to be hereinafter more specifically pointed out and claimed.

In the drawings:

Figure 1 is a plan view of the coupling in place between two trolley wires.

The wires are illustrated at 1 and 2, and are the usual trolley wires. On wire 1 is placed a right hand thread and on wire 2 is placed a left hand thread. A coupling of conductive metal is provided, as illustrated at 3, being straight, hollow and internally threaded at 4, with right hand threads and at 5 with left hand threads to accommodate the two wire ends, as in a turn buckle. The coupling is round in cross section and formed in a shape tapering from the approximate diameter of the wires to a thicker portion at the center, so as to not form a lump in the trolley line that might interfere with the gathering of current, and so as to provide a central thickness for better engagement with a wrench. As is obvious the operator first threads the two ends of the wire to be coupled and then turns on the coupling, which draws the wires together and tightly holds them against moving apart, while establishing a clean and adequate electric connection.

While the invention appears very simple, its application to the wires of a trolley system makes it of great value in mine work particularly, and in trolley work in general, since it is a saving of both time and materials, and is fool-proof to a high degree. It does not require a large kit of tools, a forge, and the like, as in a soldered splice, nor does it require any great degree of skill upon the part of the user.

Having thus described my invention, what I claim as new and desire to secure by Letters Patent, is:—

A wire splice comprising two wire ends provided with right and left hand threads respectively, and a union of conductive material having hollow ends respectively right and left hand internally threaded, said union being rounded in cross section having a diameter at the threaded ends approximating that of the wires, and tapering to a thicker portion centrally, for more ready engagement with a wrench, and said union being round in cross section and straight so as to form no interference with the gathering of current from the wires at the spliced point.

JAMES L. BLEVINS.